UNITED STATES PATENT OFFICE.

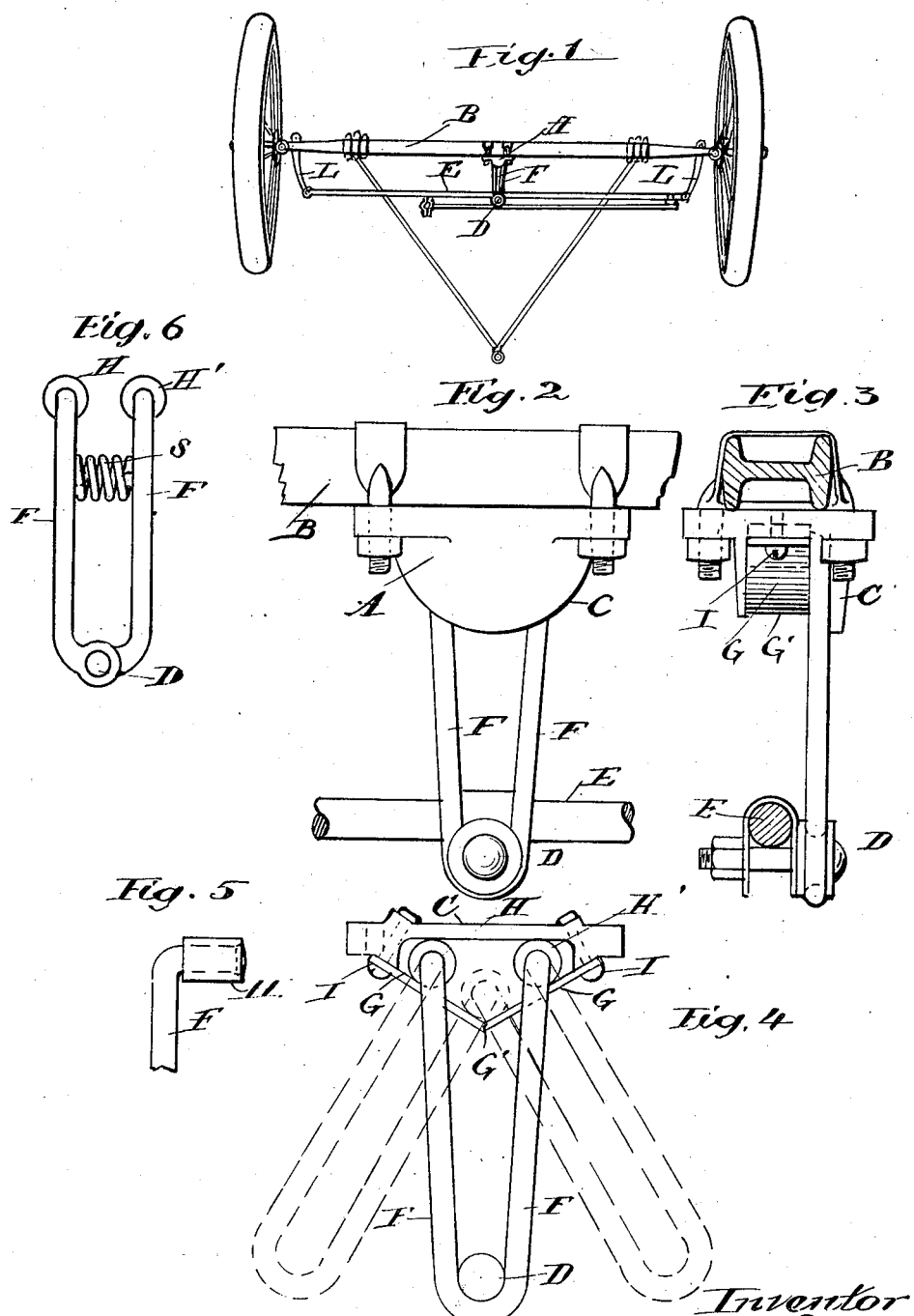

CHARLES B. POST, OF NEW LONDON, OHIO.

AUTOMATIC CONTROLLER FOR STEERING-GEARS.

1,353,610.  Specification of Letters Patent.  Patented Sept. 21, 1920.

Application filed November 1, 1917. Serial No. 199,666.

*To all whom it may concern:*

Be it known that I, CHARLES B. POST, a citizen of the United States, and resident of New London, in the county of Huron and State of Ohio, have invented certain new and useful Improvements in Automatic Controllers for Steering-Gears, of which I hereby declare the following to be a full, clear, and exact description, such as will enable others skilled in the art to which it appertains to make and use the same.

The objects of this invention are to provide an improved and efficient form of steering control, tending to maintain the wheel hubs and steering gear of an automobile in their normal position, in which the machine will travel straight ahead, and which is capable of returning them to the normal position from any necessary deviation thereof required in guiding the machine, and in this manner to relieve the driver from the close attention otherwise required to maintain a straight course.

The invention is designed to provide the greatest amount of resistance to movement of the steering mechanism when the parts are in the normal position, and always tends to return the steering gear mechanism toward the normal position. The resistance also becomes automatically less as the device departs on either side from the normal position thus making the turning of short curves a matter of easy control.

The device is designed to operate more simply and smoothly than the device illustrated and described in my previous Letters Patent No. 1,204,819, granted Nov. 14, 1916, in which the initial pressure is greater, to prevent the device from being diverted from the normal position, than the subsequent pressure applied in turning the machine.

The invention is hereinafter further described, shown in the accompanying drawings and specifically pointed out in the claims.

In the accompanying drawings Figure 1 is a plan of the invention applied to the steering gear of an automobile; Fig. 2 is an enlarged plan and Fig. 3 is an edge view thereof; Fig. 4 is a plan of the device with the cover removed; Fig. 5 is a detail of the operating spring and roller. Fig. 6 shows a modified form of spring actuated arms.

The device serves also as a shock absorber to relieve the driver from road shocks by neutralizing them as near their origin as possible.

In these views A represents a casing, which is centrally secured to the fixed axle B. This casing is provided with an integral cover C spaced from the edge of the rear wall. This casing serves as a bearing member for the extremities of spring actuated arms F, F, which are pivoted to the steering bar E at D and movable therewith.

The walls of the inclosure form a flattened triangle two sides G, G, of which are inclined toward the center G', as shown in Fig. 4. The ends of the spring actuated arms F, F, are inserted in the case underneath the cover and are turned downwardly at F', F', and are provided with rollers H, H, which engage with the walls G, G.

These walls G, G, can be made separately of hardened material and attached at I if desired. When the device is in normal position as shown in solid lines in Fig. 4 the extremities of the arms are spread apart laterally and lie in the extreme ends of the casing. When the steering bar E, with which the outer end of the loop is pivotally connected at D is in the normal position, the end of the loop can be moved to right or left, and one of the rollers will move inwardly on its respective inclined wall and will approach the other roller as shown in the dotted lines in Fig. 4, the amount of pressure required being greatest at the start, until the moved roller approaches the central position. When this position is reached both rollers lie flat on one of the inclined sides.

The return is automatic and immediate when the bar E is released. The steering bar connects the arms L, L, which operate the wheel hubs M pivoted upon the axle.

The angular opening is so proportioned that when the wheels have made their full sweep the moving roller will be in the center of the triangle at G'.

By reference to Fig. 4 it is evident that in forcing the extremity D to the left and against the resistance of the spring which tends to hold the rollers H, H, in the normal position, one of the rollers H, H, is obliged to traverse an incline G, the angular relation of which toward the arms varies as the roller H moves inwardly.

This angle between the incline and arms approximates 48° at the starting point, and is reduced to approximately 23° when the arm reaches the inner end of the incline at G'. When the rollers are farthest apart or in the normal position they have a much more bracing effect than when they approach one another.

Therefore when the arms are turned to one side the amount of resistance is lessened and the amount of incline lessened, thus materially lessening the amount of force required to move the point from side to side from the normal position and in this way reducing the resistance where it is not needed, and also acting most strongly where it is most useful.

It should be further noted that 99% of the travel of an automobile is, during the time that the machine is traveling, straight ahead, and also at a time when the machine is traveling at a high rate of speed. In this position the assistance of the steering control is most valuable but is not so necessary at low speed when making short turns. For this reason the greatest efficiency is attained where it is most needed and the lessening of resistance in making short turns becomes a special advantage.

In Fig. 6 a hinged form of arms is shown in which a separate spring S tends to hold the arms apart.

Having described the invention what I claim as new and desire to secure by Letters Patent is—

1. The combination with the axle wheel hubs and steering bar of an automobile of a casing affixed to said axle and having inclined rear walls, a looped spring member having its extremities mounted in said casing and each extremity of said spring engaging one of said inclined walls and movable thereon toward and away from the other extremity, the looped end of said spring member being pivotally attached to and movable with said steering bar.

2. The combination with the axle wheel hubs and steering bar of an automobile of a casing affixed to said axle and having inclined rear walls, a looped spring member having its extremities mounted in said casing and each extremity of said spring engaging one of said inclined walls and movable thereon toward and away from the other extremity, the looped end of said spring member being pivotally attached to and movable with said steering bar and rollers upon the extremities of said looped spring member.

3. In a device for controlling the steering gear of an automobile the combination with an axle, with hubs pivotally mounted thereon, and a steering bar connecting said hubs of a casing mounted upon said axle and provided with a triangular cavity having inclined rear walls and transverse front wall, a looped spring member pivotally attached to said steering bar and movable therewith, the extremities of said looped member being inserted in said case and being slidably movable in said cavity upon said inclined rear walls.

4. A controlling means for the steering bar of an automobile having a fixed axle comprising in combination with said bar and axle, a bearing member secured to said axle, said bearing member having walls inclined toward each other and toward the rear, and a looped spring member pivoted to said steering bar and movable therewith, the inner ends of said looped spring member being turned downwardly and being slidably movable along said inclined walls of said bearing member.

In testimony whereof I hereunto set my hand this 11th day of October, 1917.

CHARLES B. POST.

In presence of—
S. H. SANGSTER,
WM. M. MONROE.